United States Patent
Dempsey et al.

(10) Patent No.: US 6,675,134 B2
(45) Date of Patent: Jan. 6, 2004

(54) PERFORMANCE ASSESSMENT OF DATA CLASSIFIERS

(75) Inventors: Derek M Dempsey, London (GB); Kate Butchart, Stevenage (GB)

(73) Assignee: Cerebrus Solutions Ltd., Harlow (GB)

( * ) Notice: Subject to any disclaimer, the term of this patent is extended or adjusted under 35 U.S.C. 154(b) by 147 days.

(21) Appl. No.: 09/808,936

(22) Filed: Mar. 15, 2001

(65) Prior Publication Data

US 2003/0033122 A1 Feb. 13, 2003

(51) Int. Cl.[7] ................................................. G06N 3/00
(52) U.S. Cl. ........................ 702/189; 702/182; 706/20
(58) Field of Search ................................ 702/189, 108, 702/119, 120, 123, 124, 126, 129, 181–183, 185–187, FOR 103, FOR 104, FOR 134, FOR 135, FOR 139, FOR 170–FOR 173; 700/48; 706/20, 12, 10, 25, 2, 13, 16, 45; 382/156, 158–160

(56) References Cited

U.S. PATENT DOCUMENTS 5,822,741 A * 10/1998 Fischthal .................... 706/16
6,067,535 A * 5/2000 Hobson et al. ............... 706/10
6,119,112 A * 9/2000 Bush ........................... 706/25
6,336,109 B2 * 1/2002 Howard ....................... 706/25
2002/0147694 A1 * 10/2002 Dempsey et al. ............ 706/12
2002/0147754 A1 * 10/2002 Dempsey et al. ........... 708/671

* cited by examiner

Primary Examiner—Hal Wachsman
(74) Attorney, Agent, or Firm—Kevin A. Oliver; Foley Hoag LLP

(57) ABSTRACT

A method for assessing the performance of a data classifier operable to generate an element of output data in response to an element of input data, such as a neural network, is disclosed. The method includes using the data classifier to generate elements of result output data in response to elements of test input data, determining a measure of difference between each element of test output data and each corresponding element of result output data, forming a distribution function of the measures of differences, and forming a measure of performance from the distribution function.

23 Claims, 1 Drawing Sheet

PERFORMANCE ASSESSMENT OF DATA CLASSIFIERS

FIELD OF THE INVENTION

The present invention relates to methods and apparatus for assessing the performance of data classifiers, such as neural networks. One specific field of application is that of training and assessing the performance of data classifiers to be used for fraud detection including, in particular, telecommunications fraud.

BACKGROUND TO THE INVENTION

Data classifiers such as neural networks typically operate by generating an element of output data in response to an element of input data. Such a data classifier may be constructed or trained using a training set of input and output data elements in such a way that not only is the data classifier able to reproduce, as accurately as possible, each element of output training data in response to each corresponding element of input training data, but it is also able to generate suitable elements of output data in response to new input data elements in a plausible and useful manner. Neural networks achieve this behaviour through the training of a plurality of interlinked neural nodes, usually constructed in software, but other schemes are known.

Data classifiers such as neural networks are commonly used in the detection of patterns or anomalies within large data sets. A particular application is that of detecting fraudulent activity on telecommunications networks, such as illicit emulation of a legitimate mobile telephone through cloning, tumbling or otherwise misusing a legitimate identification code.

An element of data for input to a data classifier may typically take the form of an input vector or similar data structure. Each input vector typically comprises a collection of parameters. In a telecommunications fraud detection system these may, for example, relate to total call time, international call time and call frequency of a single telephone in a given time interval. Each input vector is associated with an element of output data which may be as simple as a single parameter indicating the likelihood or ascertained fact that an input vector corresponds to fraudulent use of a telephone, or may itself take the form of a vector. A trained data classifier may then be considered to define a mapping between the input and output data elements.

A data classifier trained or constructed on the basis of a training set of such corresponding elements of input and output data should be able to reproduce the output data, in response to the input data, to a reasonable degree of accuracy. At the same time it will usually be important to maintain a good ability to respond in a suitable manner to new elements of input data, to retain sufficient flexibility to allow future retraining or adjustments in response to new training data and to minimise the time or other resources required in carrying out data classifier training or construction.

The balancing of these and other pertinent training factors is frequently achieved, especially in the case of neural networks, by use of a simple measure of difference between the "ideal" output data elements, usually defined by the training data set, and the data elements output by the data classifier in response to the input elements of the same data set. A commonly used measure of difference is the square root of the mean of the sum of these differences, often referred to as the "rms-error" of the data classifier, or a related measure of difference.

As a data classifier undergoes training the rms-error should reduce. It may be possible to reduce the rms-error to close to zero, but this is likely to lead to a data classifier that is very poor at generating reasonable output data elements in response to new input data elements, and that is impervious to retraining. The training process, therefore, may be halted when the rms-error reaches a predetermined threshold.

Alternatively, a subset of the training data may be kept aside and used in a separate determination of rms-error. When this separate determination of rms-error reaches a minimum and starts to rise again, training is stopped, even though the rms-error determined from the main body of training data would continue to fall. This latter method, while generally robust, has a significant drawback in that a sizeable proportion of the available training data is not actually used for training the data classifier, and such early stopping methods in general have been shown to significantly inhibit the process of training data classifiers for use in fraud detection.

The ability of a data classifier to identify patterns or characteristics in new input data differing considerably in magnitude or otherwise from the training data is particularly important for fraud detection. Particular scenarios of fraud identified within the training data may represent the most common fraud types, but variations on these scenarios may be wide ranging, and new methods and types of fraud are likely to emerge from time to time which may be only loosely related or indeed unrelated to familiar scenarios.

To some extent it is unrealistic to expect a data classifier such as a neural network to provide plausible outputs to new input data varying widely from the training data, but nevertheless, a significant degree of generalisation by a data classifier should be expected.

OBJECTS OF THE INVENTION

The present invention seeks to address the above mentioned and other problems of the related prior art. In particular, the invention seeks to provide an improved method of assessing the performance of a data classifier, and an improved method of training a data classifier, as well as apparatus for carrying out such methods.

SUMMARY OF THE INVENTION

According to a first aspect of the invention there is provided a method of assessing the performance of a data classifier operable to generate an element of output data in response to an element of input data, the method comprising the steps of:

providing test data comprising elements of test input data and corresponding elements of test output data;

operating the data classifier to generate elements of result output data in response to the elements of test input data;

determining a measure of difference between each element of test output data and each corresponding element of result output data;

forming a distribution function of said measures of difference; and forming a measure of performance of the data classifier from said distribution function.

The distribution function provides information on the way in which errors or mismatches between the test output data and result output data are distributed. A given rms-error based on the differences between a number of elements of "ideal" test output data and actual result output data may result from a lessor number of large differences or a greater number of small differences. Depending on the practical use to which the data classifier is to be put, the latter may be satisfactory, while the former may be unacceptable. By determining the said distribution function, a measure of data classifier performance may be formed which is better tailored to a particular practical application.

The test data may comprise data used to train the data classifier prior to an assessment of performance, or the test data may be independent of training data.

Preferably, the step of forming the distribution function comprises the steps of categorising the measures of difference into a plurality of categories and counting the number of measures of difference falling in each category. The precise boundaries of such categories may not be important, but it may be desirable, for example, to set categories representative of unacceptable differences, acceptable differences and negligible differences. The measure of performance could then be formed to heavily penalise differences in the first category, but to ignore differences in the third category. This may be carried out, for example, by forming a weighted sum of the number of measures of difference falling in each category, using a set of predefined weights. Advantageously, these predefined weights may be chosen to lend more weight to larger measures of difference than to smaller measures of difference.

Preferably, the above mentioned weighted sum is normalised using a factor related to the number of elements of test input data. This may be carried out by dividing the weighted sum by a factor comprising the number of elements of test input data. Advantageously, this factor may comprise the reciprocal of a logarithm of the number of elements of test input data. This formulation has been found to relieve bias in the measure of performance against smaller sets of test data.

The test data may comprise account fraud data, and in particular telecommunications account fraud data. Preferably, the data classifier comprises a neural network.

In an alternative form of the method, the measure of performance may be formed using a continuous, rather than a categorised distribution function. In another alternative, a discrete or continuous weighting function is be applied to each measure of difference, and the measure of performance is then formed from the so weighted measures of difference.

According to a second aspect of the invention, a weighting function is applied directly to said measures of difference, and a measure of performance of the data classifier is formed from the resulting weighted measures of difference.

According to a third aspect of the invention, there is provided a method of training a data classifier that is operable to generate output data in response to input data, the method comprising the steps of:

training the data classifier;

forming a measure of performance of the data classifier using a method described herein; and optionally retraining the data classifier in response to said measure of performance.

For example, the data classifier could be repeatedly retrained until the measure of performance reached a threshold value. Typically, retraining will be carried out only if it is expected to improve said measure of performance.

Preferably, the data used for training and retraining includes some or all of the test data.

According to a fourth aspect of the invention there is provided a data classifier system comprising:

a data classifier operable to generate elements of result output data in response to elements of test input data, said elements of test input data also corresponding to elements of test output data;

a difference generator operable to determine a measure of difference between each element of test output data and each corresponding element of result output data;

a distribution function generator operable to form a distribution function of said measures of difference; and a performance measure generator operable to form a measure of performance of the data classifier from said distribution function.

More generally, the invention provides apparatus operable to carry out the steps of any of the methods of the invention.

Apparatus embodiments of the invention may be implemented in software, hardware, or a combination of the two, for example on one or more computer systems comprising memory, one or more central processing units and suitable input and output mechanisms. Software may also be provided in a machine readable form to carry out the steps of any method embodying to the invention. Such software may be provided on removable media, may be pre-installed on suitable computer systems, or may be transmitted as a signal.

Embodiments of the invention will now be described, with reference to the accompanying drawing.

DETAILED DESCRIPTION

Figure 1:
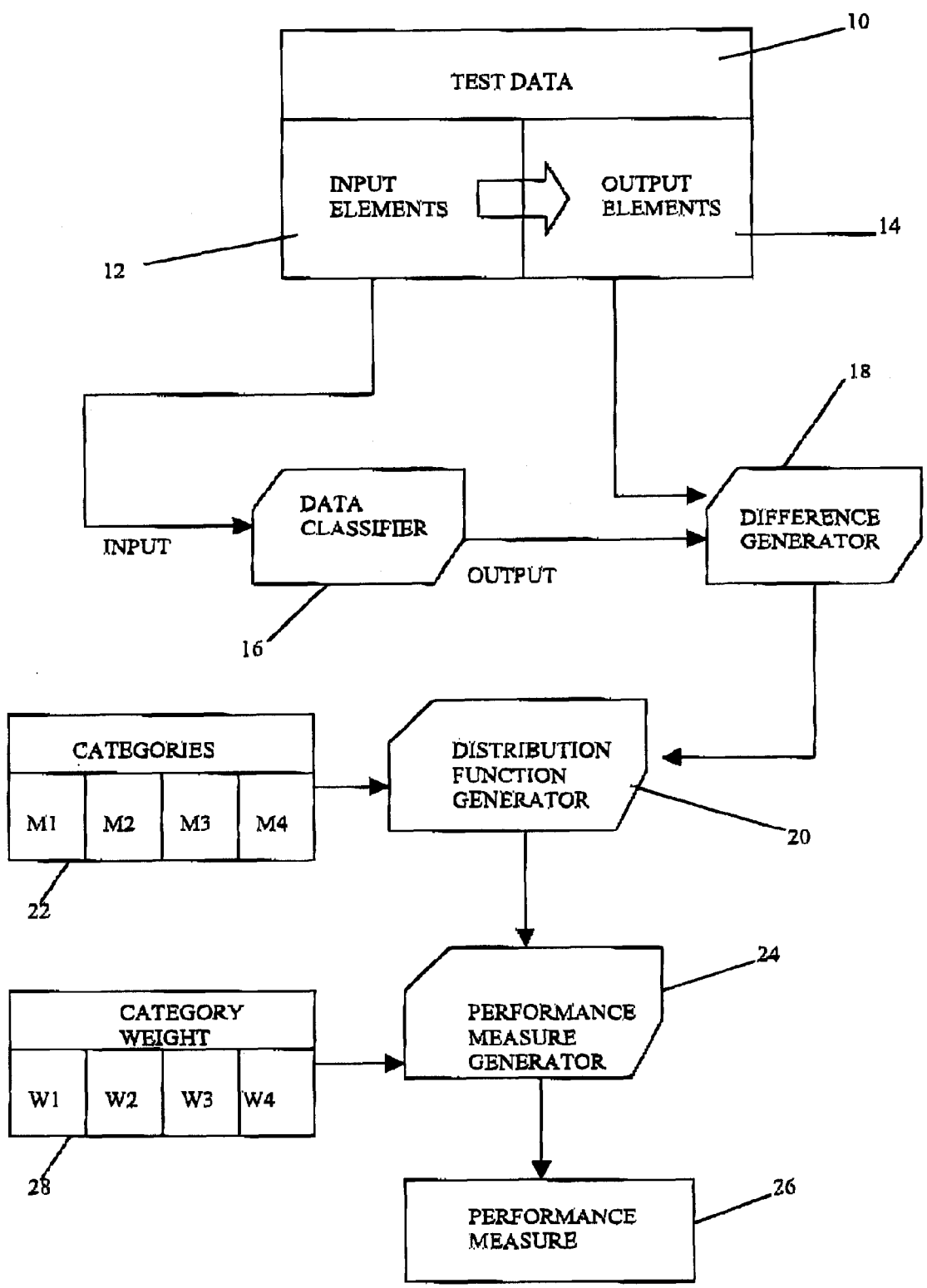
FIG. 1 is a schematic of a system for assessing the performance of a data classifier in which data units are shown as rectangles, functional units as truncated rectangles, and data flows as arrows.

A typical data classifier, such as a neural network for detecting telecommunications account fraud, operates by generating elements of output data in response to elements of input data. While each element of input data is typically a vector or other collection of independent parameters such as total call time, international call time and call frequency from a single telephone over a given time interval, each element of output data is typically a single parameter. Conveniently, this output parameter may range between zero, indicating no fraudulent activity, to one, indicating definite fraudulent activity, with values in between indicating a probability or degree of confidence of fraudulent activity. Consequently, a set of training data for training or constructing such a data classifier will typically comprise a plurality of different examples of input data vectors, and a set of corresponding output elements having values of either one or zero, depending on whether or not the associated input data did, in fact, result from fraudulent activity.

The classification characteristics of the data classifier may be assessed by providing test data comprising elements of test input data and test output data, and operating the data classifier to generate elements of result output data in response to the elements of test input data. The differences between the result output data and the test output data can then be used to form a measure of performance of the data classifier. Typically, the classifier may be tested using part or all of the training data. However, this need not be the case and independent test data could be used.

A number of categories may be defined to group result output data elements. The examples here are for result output data elements having values ranging between zero and one, which correspond to test output data values of one, i.e. when the test input data is known to correspond to fraudulent activity. Some reasonable categories for result output data values corresponding to test data output values of 1.0 are shown in table 1. An M4, or "high classification", is used for result output data values greater than 0.95, an M3, or "medium classification" is used for result output data values greater than 0.75 and up to 0.95, an M2, or "low classification" is used for result output data values greater than 0.5 and up to 0.75, and an M1, or "mis-classification" category is used for result output data values less than or equal to 0.5.

TABLE 1

| Category | Test output data element | Result output data element | Description |
|---|---|---|---|
| M1 | 1.0 | x ≤ 0.5 | mis-classification |
| M2 | 1.0 | 0.5 < x ≤ 0.75 | low-classification |
| M3 | 1.0 | 0.75 < x ≤ 0.95 | medium-classification |
| M4 | 1.0 | 0.95 < x | high-classification |

Similar categories could be assigned for elements where the test output data is zero, i.e. not fraudulent, or non-fraudulent examples could be combined into the same, or a similar category scheme. The categorisation scheme effectively assesses the distribution of differences between the test and result output data elements, and makes this distribution function available for further processing.

The above categorisation scheme was applied to a neural network system trained using eight different input data sets of telecommunications fraud data, referred to a $N1, \ldots N8$. The results are summarised in table 2, in which the eight rows correspond to the eight data sets. The rms-error of each resulting neural network, calculated from the square root of the mean of the squares of the differences between each element of test output data and each corresponding element of result output data, is shown in the second column, and converted to a "neural network performance" R in the third column. Columns four, five and six show the number of elements of result output data placed in each of categories M1, M2 and M3 respectively, and the final column shows the total number of elements of test input data in each of the eight data sets.

TABLE 2

| Data set | rms-error | R | M1 | M2 | M3 | Total |
|---|---|---|---|---|---|---|
| N1 | 0.056 | 94.4 | 0 | 0 | 30 | 1429 |
| N2 | 0.03727 | 96.3 | 2 | 1 | 7 | 1398 |
| N3 | 0.04557 | 95.4 | 0 | 3 | 47 | 1477 |
| N4 | 0.06765 | 90.3 | 2 | 0 | 1 | 1601 |
| N5 | 0.01637 | 98.4 | 0 | 0 | 2 | 506 |
| N6 | 0.03708 | 96.3 | 1 | 0 | 0 | 1492 |
| N7 | 0.42788 | 57.2 | 1 | 0 | 0 | 100 |
| N8 | 0.14216 | 85.8 | 2 | 3 | 2 | 1475 |

The results of the above categorisation process may be used to form a measure of data classifier performance which is more useful than a simple rms-error in many respects. To form such a measure of performance it is desirable to take account of the number of result output data elements falling in each category, to provide appropriate weights to these numbers, and to take account of, or provide some normalization in respect of the total number of elements in the test data set.

For assessing the performance of a data classifier trained to detect telecommunications account fraud, it is appropriate to penalise mis-classifications heavily where the classifier does not recognise genuine fraudulent activity. An appropriate set of weightings for the above categorisation scheme is, for example, to weight the number of result output data elements falling in category M1 by a multiple of 100, in M2 by 10, in M3 by 1, and in M4 by zero.

Weighting and summing the numbers of result output data elements falling in each category yields a classification score inversely indicative of the performance of the data classifier. To render this score into a useful number ranging from zero to one hundred, a realistic assessment of the number of input data elements that can acceptably be mis-classified needs to be made. A rough estimate for a telecommunication fraud detection system is that 10% of the input data set being mis-classified is unacceptable, so this should correspond to a zero value of the performance measure. The best performance is for all result output data elements to be classified in category M4. A suitable formula for such a measure of performance P1, implementing this scale, is given by:

$$P1=100 \exp(-(100m1+10m2+m3)/n)$$

where m1, m2 and m3 are the number of result output data elements falling in categories M1, M2 and M3, and n is the number of input or output data elements in the test data set.

The results of applying the above formula for P1 to the results of training and testing a neural networking using the eight data sets N1–N8 of table 2 are shown in table 3. Column 2, labelled "M_score" lists the sum of the weighted counts of the categorised result output data elements (M_score=100m1+10m2+m3). Column 3, labelled "R", lists the rms-error based performance measure also shown in column 3 of FIG. 1. Column 4, labelled "P1", lists the performance measure calculated using the formula for P1 given above, and column 5 lists the average of columns 3 and 4 for each test data set N1–N8.

TABLE 3

| Data set | R | M_Score | P1 | Average R, P1 |
|---|---|---|---|---|
| N1 | 94.4 | 30 | 97.9 | 96.1 |
| N2 | 96.3 | 217 | 85.6 | 91.0 |
| N3 | 95.4 | 77 | 94.9 | 95.2 |
| N4 | 90.3 | 201 | 88.2 | 89.3 |
| N5 | 98.4 | 2 | 99.6 | 99.0 |
| N6 | 96.3 | 100 | 93.5 | 95.4 |
| N7 | 57.2 | 100 | 36.8 | 47.0 |
| N8 | 85.8 | 232 | 85.4 | 85.6 |

The measure of performance given by the formula for P1 seems to provide a reasonable assessment of classification performance for neural networks trained to identify fraud in telecommunications account data. The result for test data set N7 shown in table 3 is probably unduly harsh, representing a single mis-classification or from a data set of 100 examples. The same circumstances for data set N6 having 1492 examples gives a reasonably high score. It would seem that some sort of compensation for data set size is needed.

The measure given by P1 penalises mis-classifications, which is appropriate. For neural networks detecting fraud, a higher rms-error and no mis-classification is generally preferable to a lower rms-error with one mis-classification.

It is interesting to compare the P1 column of table 3 with the rms-error based R column. The result output data elements generated by neural networks trained and tested using data sets N1, N3 and N5 contained no mis-classifications. In two of these cases, the result is a P1 measure of performance higher than the rms-error based measure R. The only large differences between the two scoring schemes arise from data sets N2 and N7. N7, a small data set, is discussed above. The rms-error based measure R arising from training and testing using N2 is surprisingly large considering that the result output data contained two mis-classifications. The low P1 score for N2 appears to reflect over fitting by the neural network to the remaining data.

As mentioned above, the measure of performance given by the formula for P1 is biased against smaller sets of test data. This bias becomes extreme for very small data sets. Data sets used for training neural networks to detect telecommunications account fraud may typically comprise about 500 to 1500 input or output data elements. The following formula for a correction factor C1 may be used to substitute for n in the above formula for performance measure P1, to compensate for variations in data set size over the range 500–1500:

$$C1=3n/\log_{10}(n)$$

where n is the number of input or output data elements in the test data set. Performance measure P1 corrected using C1 will be denoted P2. Using correction factor C1 yields a performance measure P2 which is still rather biased, yielding unduly low values for small test data sets.

Table 4 is similar to table 3, but with an added column showing the C1 corrected performance measure P2 for neural networks trained and tested using data sets N1–N8. The last column of the table shows the average of the rms-error based measure R and the corrected performance measure P2 for each data set.

TABLE 4

| Data set | R | M_Score | P1 | P2 | Average R, P1 |
|---|---|---|---|---|---|
| N1 | 94.4 | 30 | 97.9 | 97.9 | 96.2 |
| N2 | 96.3 | 217 | 85.6 | 85.0 | 90.7 |
| N3 | 95.4 | 77 | 94.9 | 94.6 | 95.2 |
| N4 | 90.3 | 201 | 88.2 | 87.5 | 88.9 |
| N5 | 98.4 | 2 | 99.6 | 99.6 | 99.0 |
| N6 | 96.3 | 100 | 93.5 | 93.2 | 94.8 |
| N7 | 57.2 | 100 | 36.8 | 51.3 | 54.3 |
| N8 | 85.8 | 232 | 85.4 | 84.7 | 85.3 |

A stronger, perhaps more appropriate correction factor for telecommunications account fraud data sets of about 500–1000 elements is given by:

$$C2=9n/\log_{10}^2(n)$$

Table 5 shows the results of substituting the correction factor C2 in place of n in the formula for P2, to yield a further revised performance measure P3. Table 5 is similar to tables 3 and 4, having eight rows corresponding to the results of training and testing a neural network using the eight data sets N1–N8.

TABLE 5

| Data set | R | M_Score | P3 | Average R, P1 |
|---|---|---|---|---|
| N1 | 94.4 | 30 | 97.7 | 98.4 |
| N2 | 96.3 | 217 | 84.3 | 90.3 |
| N3 | 95.4 | 77 | 94.3 | 94.9 |
| N4 | 90.3 | 201 | 86.7 | 88.5 |

TABLE 5-continued

| Data set | R | M_Score | P3 | Average R, P1 |
|---|---|---|---|---|
| N5 | 98.4 | 2 | 99.7 | 99.1 |
| N6 | 96.3 | 100 | 92.8 | 94.6 |
| N7 | 57.2 | 100 | 64.1 | 60.7 |
| N8 | 85.8 | 232 | 83.9 | 84.9 |

Performance measure P3 is therefore given by the formula:

$$P3=100\ \exp(-(100m1+10m2+m3)/(9n/\log_{10}^2(n))$$

This measure provides a performance measure that is reasonable over a wide range of sizes of test data sets. The size correction is based on the premise that the performance measure is intended for use with test data sets containing about 1000 input or output elements. The correction factor adjusts the performance measure so that the weighting for mis-classifications is based on the above discussed benchmark of 10% mis-classifications yielding a measure of zero.

In addition to increasing the performance measure for small data sets, the correction factor C2 reduces the magnitude of the performance measure for data sets having more than 1000 elements. However, this effect is not large for reasonably sized data sets of up to a few thousand elements. This effect, moreover, does not affect the monotonic behaviour of P2, namely, as the data set size increases so does the performance measure.

Numerical experiments carried out with genuine telecommunications account fraud data show that in all cases where a neural network mis-classifies one or more input elements of test data, the performance measure P3 is well below the rms-error based measure R, and that the performance measure drops rapidly with further mis-classifications. This is desirable behaviour for a neural network used for detecting account fraud. Conversely, for the two data sets N1 and N5 above for which the trained neural network did not mis-classify any of the input data elements, the performance measure was higher than the rms-error based measure R. Again, this is desirable behaviour for fraud detection systems.

Referring now to FIG. 1 there is shown a schematic diagram of a data classifier with associated apparatus and data structures for generating a measure of performance of the data classifier. The illustrated arrangement may be operated according to any of the methods described above. Data units are shown as rectangles, functional units as truncated rectangles and data flows as arrows.

Test data 10 comprises elements of test input data 12 and corresponding elements of test output data 14. Elements of the test input data 12 are passed to a data classifier 16. The data classifier 16 may typically have been trained using part or all of the test data 10, or may be in the process of being so trained.

The data classifier 16 generates an element of result output data in response to each element of test input data, and passes these element of result output data to a difference generator 18. The difference generator 18 compares each element of result output data with each corresponding element of test output data 14 and forms therefrom a measure of difference. If the output elements are scalar values then the measures of difference may be formed by a simple subtraction. The measures of difference indicate to what extent the data classifier is failing to reproduce the appropriate test data output elements.

The measures of difference are passed to a distribution function generator 20, which may conveniently operate according to the method described above by classifying the measures of difference into a number of categories 22, and counting the number of measures of difference so categorised into each category. Categories M1–M4 described above, and summarised in table 1, are representative of "mis-classifications" (large measures of difference), "low-classifications" (moderate measures of difference), "medium-classifications" (small measures of difference) and "high-classifications" (negligible measures of difference).

The distribution function generator 20 generates a distribution function of the measures of difference, which is passed to a performance measure generator 24. The performance measure generator is adapted to form performance measure 26, for example in accordance with one of the equations for performance measure P1, P2 or P3 given above. The distribution function in these equations is represented by parameters m1, m2 and m3 which are the number of measures of difference falling into each category M1, M2 and M3. In forming the measure of performance, the distribution function is weighted according to a set of category weights 26, shown as w1–w4 in FIG. 1. In the method described above, w1=100, w2=10, w3=1 and w4=0.

If the data classifier is in the process of being trained, the performance measure 26 may be used to assess whether further training is required, for example by reference to a threshold.

A number of variations to the described embodiments will now be discussed. Although a classification scheme using four categories has been described, using particular weighting factors, other distribution functions of the differences between ideal and actual data classifier output data could equally be used, along with any weighting scheme suitable for the particular application at hand. Indeed, in other embodiments of the invention, a weighting function is applied directly to the measures of difference between the ideal and actual output data. It will also be apparent that one or more continuous functions could be used in place of the discrete categorisation described.

The test output data described in connection with the embodiments described above has two values: "one" indicates confirmed fraud, and "zero" indicates confirmed no fraud. However, other output, and indeed input data types may be used. The elements of test output data, for example, could comprise real rather than discrete values, or other data types such as vectors, as long as a suitable measure of difference between the test output data and result output data can be used.

The embodiments have been described in respect of neural networks trained and tested using telecommunications account fraud data. Clearly, the invention is also applicable to the training and testing of other types of data classifier, and to data classifiers and data classifier systems adapted for other purposes.

The performance measures described may typically be implemented in software on suitable computer systems, which typically will also host the subject data classifier software.

A particular use of performance measures according to the invention is in the training of data classifiers. At each stage of training, such a performance measure may be used to assess the progress of the training which may, for example, be halted when the performance measure reaches a predetermined threshold. Performance measures according to the invention may also be used, for example, to compare two or more different data classifiers.

What is claimed is:

1. A method of assessing the performance of a data classifier operable to generate an element of output data in response to an element of input data, the method comprising:
   providing test data comprising elements of test input data and corresponding elements of test output data;
   operating the data classifier to generate elements of result output data in response to the elements of test input data;
   determining a measure of difference between each element of test output data and each corresponding element of result output data;
   forming a distribution function of said measures of difference; and
   generating a measure of performance of the data classifier from said distribution function.

2. A method according to claim 1 wherein forming a distribution function comprises:
   categorizing the measures of difference into a plurality of categories; and
   counting the numbers of measures of difference in each category.

3. A method according to claim 2 wherein forming a measure of performance comprises forming a weighted sum of the number of measures of difference in each category using predefined weights.

4. A method according to claim 3 wherein the predefined weights are chosen to provide more weight to larger measures of difference.

5. A method according to claim 3 wherein forming a measure of performance further comprises normalizing the weighted sum using a factor related to the number of elements of test input data.

6. A method according to claim 5 wherein normalizing comprises dividing the weighted sum by a factor comprising the number of elements of test input data.

7. A method according to claim 5 wherein normalizing comprises dividing the weighted sum by a factor comprising the reciprocal of a logarithm of the number of elements of test input data.

8. A method according to claim 1 wherein the test data comprises telecommunications account fraud data.

9. A method according to claim 1 wherein the data classifier comprises a neural network.

10. A method of assessing the performance of a data classifier operable to generate an element of output data in response to an element of input data, the method comprising:
    providing test data comprising elements of test input data and corresponding elements of test output data;
    operating the data classifier to generate elements of result output data in response to elements of the test input data;
    determining a measure of difference between each element of test output data and each corresponding element of result output data;
    applying a weighting function to said measures of difference to form weighted measures of difference; and
    generating a measure of performance of the data classifier from said weighted measures of difference.

11. A method of training a data classifier operable to generate output data in response to input data, the method comprising:
    training the data classifier;
    providing test data comprising elements of test input data and corresponding elements of test output data;

operating the data classifier to generate elements of result output data in response to the test input data;

determining a measure of difference between each element of test output data and each corresponding element of result output data;

forming a distribution function of said measures of difference;

generating a measure of performance of the data classifier from said distribution function; and optionally retraining the data classifier in response to said measure of performance.

12. A method according to claim 11 wherein optionally retraining the data classifier is carried out if said retraining is expected to improve said measure of performance.

13. A method according to claim 11 wherein at least some of said test data is used in said training.

14. A method according to claim 11 wherein at least some of said test data is used in said optionally retraining.

15. A data classifier system comprising:

a data classifier operable to generate elements of result output data in response to elements of test input data, said elements of test input data also corresponding to elements of test output data;

a difference generator operable to determine a measure of difference between each element of test output data and each corresponding element of result output data;

a distribution function generator operable to form a distribution function of said measures of difference; and a performance measure generator operable to generate a measure of performance of the data classifier from said distribution function.

16. A system according to claim 15 wherein the distribution function generator is further operable to:

categorize the measures of difference into a plurality of categories; and to count the number of measures of difference in each category.

17. A system according to claim 16 wherein the performance measure generator is further operable to form a weighted sum of the number of measures of difference in each category using predefined weights.

18. A system according to claim 17 wherein the predefined weights provide more weight to larger measures of difference.

19. A system according to claim 17 wherein the performance measure generator is further operable to normalize the weighted sum using a factor related to the number of elements of test input data.

20. A system according to claim 19 wherein the performance measure generator, in carrying out the normalization, is further operable to divide the weighted sum by a factor comprising the number of elements of test input data.

21. A system according to claim 19 wherein the performance measure generator, in carrying out the normalization, is further operable to divide the weighted sum by a factor comprising the reciprocal of a logarithm of the number of elements of test input data.

22. A system according to claim 15 wherein the data classifier comprises a neural network.

23. Computer software in a machine readable medium for providing at least part of a data classifier system when executed on a computer system, the software being operable to:

receive test data comprising elements of test input data and corresponding elements of test output data;

receive elements of result-output data generated by a data classifier in response to said test input data;

determine a measure of difference between each element of said test output data and each corresponding element of said result output data;

form a distribution function of said measures of difference; and generate a measure of performance of the data classifier from said distribution function.

* * * * *